United States Patent
Chang et al.

[19]

[11] Patent Number: 6,130,798
[45] Date of Patent: Oct. 10, 2000

[54] HARDWARE PES CALCULATOR

[75] Inventors: Dar-Der Chang, Fremont; Richard K. Wong, San Jose, both of Calif.

[73] Assignee: Seagate Technology LLC, Scotts Valley, Calif.

[21] Appl. No.: 08/937,103

[22] Filed: Sep. 24, 1997

[51] Int. Cl.[7] .................................................. G11B 5/596
[52] U.S. Cl. ..................................... 360/77.05; 360/77.07
[58] Field of Search ................................. 360/75, 77.07, 360/77.02, 77.08, 78.04, 78.14, 77.05

[56] References Cited

U.S. PATENT DOCUMENTS

| | | | |
|---|---|---|---|
| 5,760,990 | 6/1998 | Ukani et al. | 360/77.04 |
| 5,818,659 | 10/1998 | Cheung et al. | 360/77.08 |
| 5,828,516 | 10/1998 | Park | 360/78.14 |

Primary Examiner—William Klimowicz
Attorney, Agent, or Firm—Flehr Hohbach Test Albritton & Herbert LLP

[57] ABSTRACT

In the disk controller in a hard disk system, the microcontroller is an integral part of the servo positioning system. The servo positioning system is the system responsible for positioning the read/write heads. This involves moving the read/write heads from track to track and holding the head in place as data is read or written. A time and calculation intensive portion of the control algorithm is the calculation of the position error signal, which represents the degree to which the actual position of the head varies from the desired position. A hardware position error signal circuit is provided to calculate this signal, thus freeing microprocessor bandwidth for other tasks and facilitating a more stable controller. Furthermore, a circuit for adjusting erroneous cylinder numbers is provided.

16 Claims, 6 Drawing Sheets

//HARDWARE PES CALCULATOR

BACKGROUND OF THE INVENTION

The present invention relates generally to the field of mass storage systems and more particularly to the field of hard disk read/write head servo positioning systems.

The microcontroller in a modern hard disk system has many demands on its processing capabilities. As host computers demand quicker response, higher transfer speed, greater capacity, lower power, and other special features, the microcontroller is pushed to the limits of its capacity. Often, the microcontroller is forced to delay or deny one or more of these demands. This is especially true with the use of inexpensive microcontrollers to reduce disc drive costs.

One of the primary tasks of the microcontroller is that of guiding the hard disk's read/write head(s) across the disk platter(s), positioning the head in preparation for a read or write operation, and then to hold the head in place while the read or write operation is in progress. The more accurately the head can be moved into place, and centered over the location where the data is to be stored or read, the faster and more reliable the host computer will process its data; so the microcontroller must try to accomplish the move as fast and as accurately as possible.

First, to accommodate high transfer speeds, the platter is rotating at a very high speed. Thus, the microcontroller does not have much time in which to check the position of the head and make corrections. Alternatively, the speed which the platter rotates may be limited by the reaction time of the microcontroller. Second, to increase platter capacity, data is packed closer together on the platter. Thus, the read/write head must be positioned with optimum accuracy. Alternatively, the capacity of the disk drive may be limited by the precision of the positioning system. Third, in order to make the maximum amount of data storage space available, the number of servo bursts provided should be kept to a minimum. Also, if the head can be positioned more accurately, the tracks can be placed more closely together.

In short, the microcontroller in a modern disk drive system is asked to move the read/write head into position, and hold it in position, with fewer instructions, and with greater accuracy than ever before. There is thus a great need for a read/write head servo positioning system in which the above goals are achieved; this may be achieved, at least in part, by a system where some of these tasks are preformed independently of the microcontroller.

SUMMARY OF THE INVENTION

Accordingly, it is an object of the present invention to provide a hardware PES calculator which will perform at least one of the time and calculation intensive parts of the microcontroller's task in the servo positioning system, and pass the results to the microcontroller. Thus, it is an object of the present invention to provide a hardware PES calculator for obtaining the cylinder number from the read head, and at least under certain circumstances, to correct the cylinder number when it is inaccurate.

Another object of the present invention is to provide a system and method for correcting the position of a read head relative to a target track comprising determining whether the read head is positioned over the inside of an even track, the outside of an even track, the inside of an odd track, or the outside of an odd track. Where the cylinder number is odd, and the head is positioned over an even track, or the cylinder number is even, and the head is positioned over an odd track, the cylinder number is corrected by subtracting one from the cylinder number if the head is positioned over the outside of the track, or adding one to the cylinder number if the head is positioned over the inside of the track.

Another object of the present invention is to provide a hardware PES calculator which calculates the distance between the read head and the desired position of the head relative to the track, combines this information with the read and/or adjusted cylinder number to obtain the position of the read head, compares this position with the desired position to obtain the position error signal, outputs the position error signal to the microcontroller, and signals the write head to stop writing if the head is off track.

Yet another object of the invention is to provide a linearizer for linearizing the position information received from the read head.

Yet another object of the present invention is to provide a method of monitoring the cylinder number and modifying the position of the transducer when the cylinder number is in error.

BRIEF DESCRIPTION OF THE DRAWINGS

The essential features and function of the present invention will be more clearly understood in reference to the following figures and description, wherein.

DETAILED DESCRIPTION OF A PREFERRED EMBODIMENT

Figure 1:
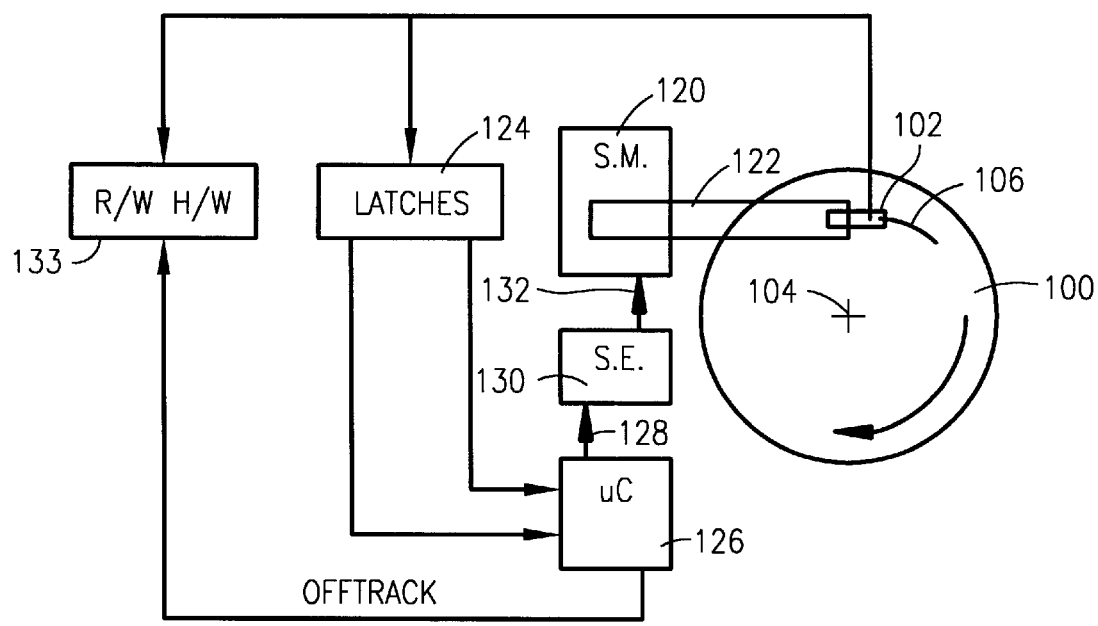
FIG. 1 depicts the prior art read/write head servo positioning system.

FIG. 1 is a block diagram showing a typical prior art read/write head servo positioning system. As shown, the hard disk drive includes a magnetic platter 100 on which data is stored. A write head 102 is provided to write data onto the platter 100 at one of a plurality of tracks, and a read head 102 is provided to read data off of the platter 100. The heads are supported on a slider 101 which flies over the surface of the disc and is moved by the actuator arm 122 from track to track. Alternatively, one head could be provided which both writes to the platter 100 and reads from the platter 100.

Data may be stored on the platter 100 in many ways. In a magnetic hard disk system, data is stored on the surface of the platter 100 as a magnetic pattern. In such a system, the write head 102 is designed to produce a magnetic field which, when brought near the surface of the platter 100, causes the magnetic particles on the surface to become aligned with the field generated by the write head 102. Thus, by changing the magnetic field produced by the write head 102 in a predetermined way in response to the data while sequentially moving the write head 102 to adjacent positions on the platter 100, the data is magnetically encoded on the platter 100.

Later, to read the data back from the platter 100, a read head 102 is brought into proximity to the surface of the platter 100 in the same position where the data was previously written. The read head 102 is constructed such that an electrical signal is generated in response to the orientation of the magnetic particles on the platter 100 surface under the read head 102. Thus, as the read head 102 moves across the surface of the platter 100 following the same sequence of positions which the write head 102 earlier traversed, the data is read back off the platter 100.

The platter 100 rotates about an axis 104 perpendicular to the face of the platter 100 and extending through the platter 100 center to record or read data along a circular path called a track 106 which has a constant radius from the center of the track.

Figure 2:
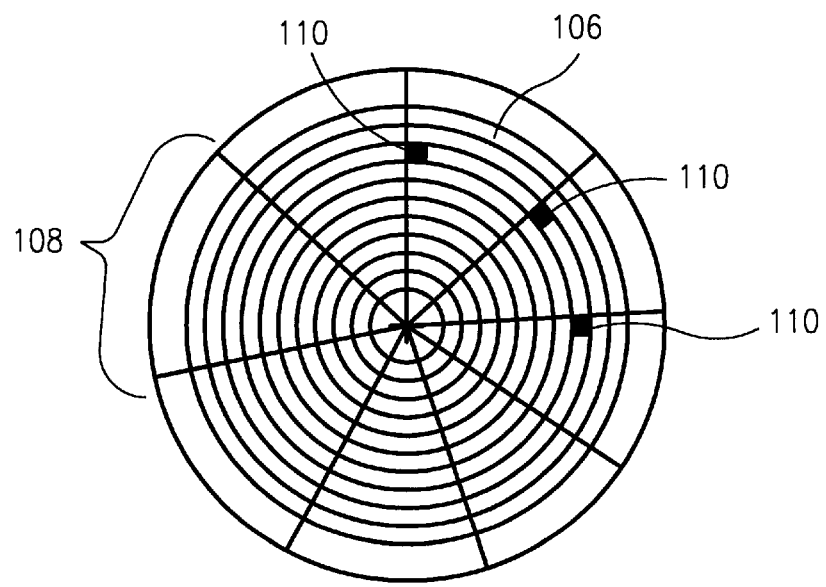
FIG. 2 depicts a typical platter 100 within a hard disk system.

FIG. 2 is a diagram showing the structure of the data as it is recorded on the surface of the platter 100. A complete circle of data at a particular radius is called a track 106. The platter 100 is divided radially into pie-shaped sections 108. One section of a track 106 within one of the pie-shaped sections 108 is called a sector. At the beginning of each sector along every track 106, positioning information 1 10 is recorded which gives the address or position of that sector on the platter 100. This positioning information 110 is used by the servo system to keep track of the current position of the read/write head. Many such tracks 106 are recorded concentrically to fill the surface of the platter 100. A typical platter 100 might contain 10k tracks 106 and be divided into (92) sectors although of course other numbers are possible.

Returning to FIG. 1, positioning the read/write head 102 involves the steps of first moving the head 102 to the specified track 106, and second holding the head 102 above the track 106 while data is either written or read. In other words, the head 102 is moved to a certain radius, and then held at that radius. This radial positioning is controlled in part by a servo mechanism 120 attached to an actuator arm 122 supporting the read/write head 102. The servo mechanism 120 cooperates with a motor or other electromechanical means for moving the actuator arm 122 and thus the read/write head 102. Furthermore, the servo mechanism 120 may include more than one motor or other electromechanical moving means, where one moving means is configured to provide gross positioning of the head 102, and another moving means is configured to provide fine positioning of the head 102.

As the platter 100 rotates under the read head 102, the positioning information (110 of FIG. 2) is read from the beginning of the sectors (108 of FIG. 2) as described above. This information is transferred to a set of latches 124, which extract the various parts of the positioning information (110 of FIG. 2) and hold them for later use. Specifically, the latch hardware extracts a number representing the track number over which the head 102 is positioned. The track number is also referred to as the cylinder number. Also, according to this invention, the latch hardware extracts four numbers A, B, C, and D which together describe the head's distance from the center of the track.

The cylinder number and A, B, C, and D are read by a microcontroller 126. Using this information, the microcontroller 126 can tell 1) if the read/write head 102 is positioned over the correct track 106, and 2) if the head 102 is positioned over the desired position of the track 106, or is slightly off track. The microcontroller 126 can determine to what extent and in which direction the head 102 is off track. The measure of to which direction and to what extent the actual head 102 position deviates from the desired position is called the Position Error Signal (PES). The microcontroller 126 uses the PES to calculate a correction signal 128 which describes the direction and magnitude of the position change necessary to bring the head 102 to the correct position. The microcontroller 126 sends the correction signal 128 to a servo electronics unit 130. The servo electronics unit 130 takes the correction signal and generates a drive signal 132 for the servo mechanism 120 to bring the head 102 to the correct position.

This pattern of reading the actual position from the platter 100, extracting the cylinder number and A, B, C, and D, calculating a PES and a correction signal 128, and activating the servo mechanism 120 to adjust the position of the head 102 is repeated until the actual head 102 position matches the desired head 102 position. When the head 102 is in the correct position, data can be reliably read from or written to the platter 100.

This pattern is followed both to move the head 102 to the correct track in the situation where it flies over an incorrect track, and to fine tune the position of the head 102 over the track. Thus, when the microcontroller 126 first receives a command to access data on a specified track, the position of the read/write head 102 will likely be far from the desired position. Usually, the head 102 will not even be over the same track. Thus, the PES will be large, and the microcontroller 126 will send a large correction signal to the servo electronics unit. As the head 102 approaches the correct position, and finally arrives at the correct track, the PES will be small. The microcontroller will send a small correction signal to the servo electronics unit and the position of the read/write head 102 will be fine tuned.

Once the head 102 has reached the correct track, and the read/write operation has begun, the head 102 may begin to drift from the desired location over the desired location on the track. To make the necessary corrections to keep the head 102 over the desired location on the track, the positioning information is updated each time a new sector passes under the head. Thus, even during the read and write operation, the position of the head 102 is constantly monitored and fine-tuned. If the head 102 ever gets too far off track, especially during a write operation, the microcontroller generates an off track signal. This signal is delivered to the read/write electronics 133 to shut down the read/write operation and to protect the data being written from being lost and to protect the data on the disk from unintentional corruption. When the correct position is re-obtained, the read/write operation is re-commenced.

That is, the PES fine tunes the read/write head position. In such a system, a separate system, employing a speed maximization algorithm, will move the read/write head to the correct track position. Then, the positioning system will use the PES of the present invention to fine tune the position of the head over the track.

Figure 3:
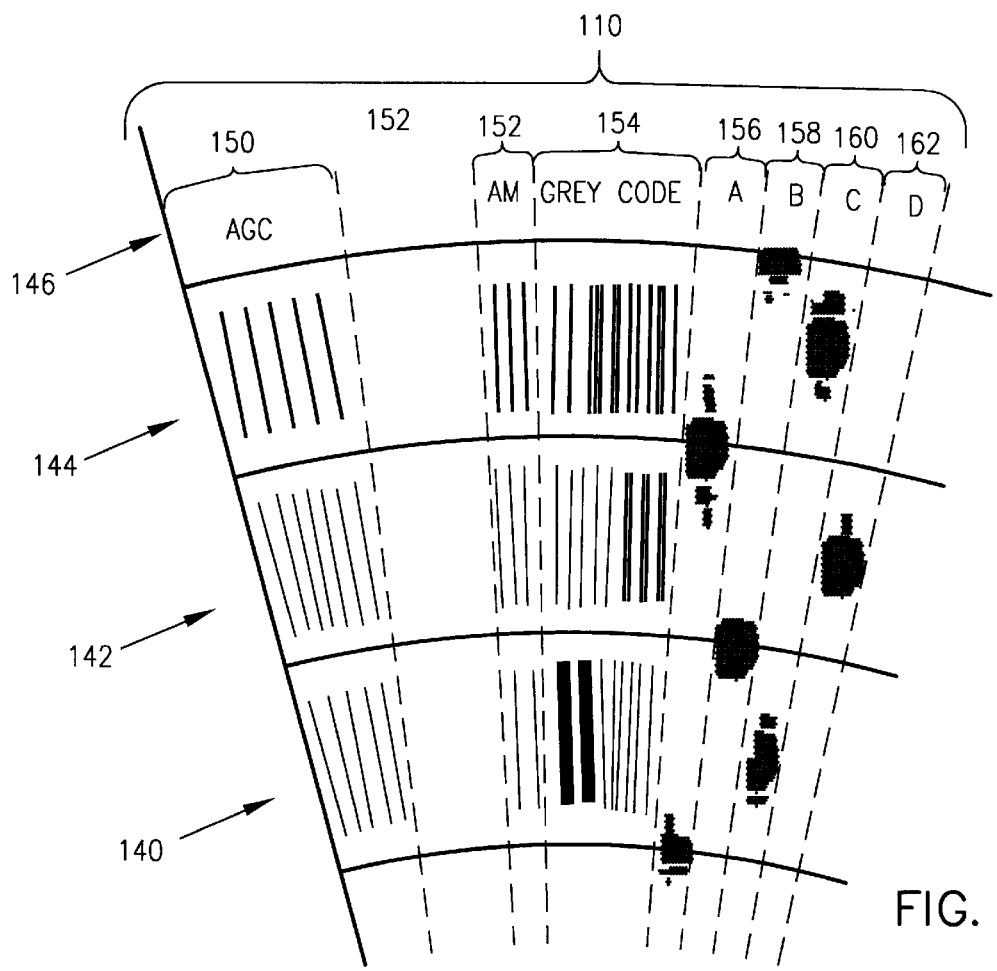
FIG. 3 is a close up view of the surface of the platter 100 at the beginning of a sector showing the position of the automatic gain control signals, the address mark signal, the greycode data, and the quad burst signals on adjacent tracks.

FIG. 3 is a diagram showing how the positioning information 1 10 is encoded at the beginning of a sector on a typical platter 100. Three adjacent tracks 140, 142, and 144 are shown. The beginning of the sector is marked for clarity with a line 146. Shades of color denote the different magnetic orientations of the particles; lighter areas indicate magnetic particles aligned in one direction and darker areas indicate particles aligned in a second direction. In practice, the actual magnetic pattern for any signal will be determined by any of a range of possible schemes. The diagrammatical scheme used in FIG. 3 has been chosen solely for illustration and is not intended to be representative of any actual magnetic encoding algorithm.

As shown in FIG. 3, the first signal which passes under the read head is the Automatic Gain Control (AGC) signal 150. This signal is used by the read/write circuitry to normalize the signal amplitude relative to the track servo signal and to set the level of the gain in the read circuitry. Following the AGC signal 150 is the Address Mark (AM) signal 152. This signal 152 marks the beginning of the address information and is used for synchronization. Following the AM signal 152 and the index signal 153, the cylinder or track number is encoded.

Cylinders are typically numbered from the center of the platter out to the periphery of the platter. The cylinder number is encoded in a special form of binary representation referred to as greycode 154. In greycode, adjacent binary numbers differ from each other by only a single bit. Additionally, every 3–5 bits, a binary one '1' may be inserted into the encoded number to keep the read circuitry in synchronization with signals from the platter. Thus, the full greycode 154 for an exemplary sequence would appear as follows. Starting with the most significant bit: 1, 1, AM, 1, INDX, G13, G12, 1, G11, G10, G9, 1, G8, G7, G6, 1, G5, G4, G3, 1, G2, G1, G0, 1.

Following the greycode 154, 4–8'bursts' 156–162 are recorded. The number of bursts can vary from system to system. These bursts 156–162 are labeled A, B, C, and D. They are recorded and interpreted in a special way which will be described below. Generally, A, B, C, and D, 156–162 are used to determine the distance from the center of the track to the read head.

Returning to FIG. 1, the latch circuitry 124 contains circuits which detect the AGC 150 and AM 152 signals. The AM signal 152 is used to set up latch signals which will 1) gather and latch the greycoded cylinder number 154, and 2) gather and latch the values A, B, C, and D 156–162.

The Bursts

Figure 4A:
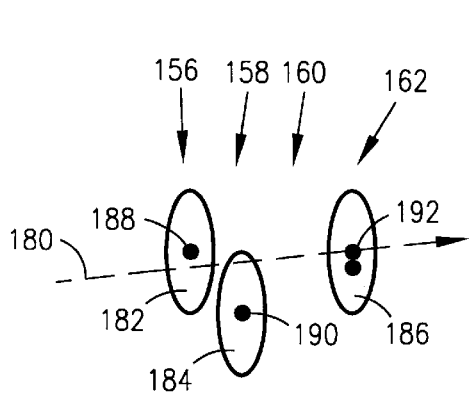
FIGS. 4a and 4b are diagrams illustrating the operation of the quad burst signals and their representation.

FIG. 4a shows how the burst signals are read and used. As shown, the read head is following a path slightly above the center of an even track. The path followed is represented by a dotted line 180. After the greycode has passed under the head, the head will pass by four burst segments A, B, C, and D 156–162. In each burst segment, areas have been strongly magnetized according to a predetermined pattern. For an even track, (for example track 142 of FIG. 3), an area 182 centering on the outer boarder between the even track and the next highest odd track has been magnetized in segment A (156). In segment B (158), an area 184 centered on the boarder between the even track and the next lowest odd track has been magnetized. In segment C (160), for an even track, no area is magnetized. Finally, in segment D (162), an area 186 centered in the even track has been magnetized.

As the read head follows the path 180 through segments A, B, C, and D (156–162), it will pick up the magnetization of the areas 182–186 just described. Practically, the read head is wide enough that it will pick up some magnetization from each of the areas A, B, and D for an even track. Furthermore, the read head will pick up magnetization not only of the surface of the platter 100 directly underneath it, but also to a lesser extent also of the surface in near proximity to it. In general, the farther away the center of the read head is from the magnetic center 188–192 of a magnetized area 182–186, the weaker will be the resulting signal generated in the read head. Thus, the strongest signal will be generated when the read head passes directly over the magnetic center of a magnetized area, as shown in segment D (162). There will also be a point where the magnetic center of a magnetized area is far enough away that practically no signal is generated in the read head.

Thus, the strongest signal picked up by the read head in FIG. 4a will occur in segment D 162, in which the read head following the path 180 will come very close to the magnetic center 192 of the magnetized area 186 in segment D 162. The next strongest signal will be picked up in A (156) and finally in B (158). No signal will be picked up in segment C (160).

Returning to FIG. 1, the latch circuitry 124 contains analogue to digital (A/D) circuits for sampling the intensity of the signal from the read head during segments A, B, C, and D. The A/D circuits also convert these intensities to binary values, which are stored for later use by the microcontroller. The microcontroller can then use the A, B, C, and D values to determine the relative position of the read head within the track. For example, for the path shown in FIG. 4a, the microcontroller 126 can tell that the read head 102 is off track center to the outside of the track because the signal from segment A (156) is stronger than that from signal B (158). By calculating how much stronger the signal from segment A is, the microcontroller 126 can tell how far to the outside the head 102 is. In this way, the microcontroller 126 is able to precisely pinpoint the position of the read head 102 within the track and fine tune the head's position.

Figure 4B:
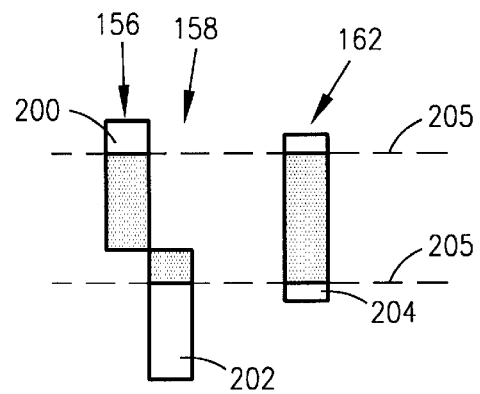

Diagrammatically, the foregoing concept is illustrated in FIG. 4b. In FIG. 4b, the magnetized areas 182–186 are indicated by shaded rectangles 200–204, and the strength of the signal generated in the read head by a magnetic area is represented by the portion of the rectangle that is within a certain distance from the center of the read head, as represented by the dotted lines 205. Thus, for a read head off track center to the outside of an even track, it is clear from FIG. 4b that the shaded area of the rectangle 200 in segment A (156) is greater than the shaded area of the rectangle 202 in segment B (158), and that the shaded area of the rectangle 204 in segment D (162) is greater than both.

Figure 5:
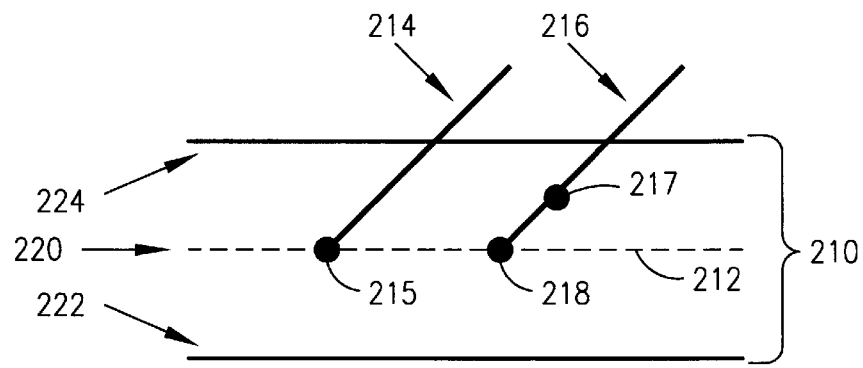
FIG. 5 is a diagram illustrating a typical positioning scheme for a traditional and a MR read/write head.

The generation of the actual position from the cylinder number and the values A, B, C, and D will be described in reference to FIG. 5. In FIG. 5, one track 210 is shown. The center of the track 210 is denoted by a dotted line 212. Two types of read/write head configurations are shown. The first is a conventional read/write head configuration 214. In this embodiment, one head, the read/write head 215, is configured both to read from the platter and to write to the platter. The second type of read/write head configuration is similar to that found on an Magneto Resonance (MR) type system. In this second type of system 216, the read head 217 and the write head 218 are separate.

The distance between the center 212 of two adjacent tracks 210 is called the servo pitch. The position of the read head 215 is specified in units of $\frac{1}{256}$th of the servo pitch. The center of the innermost track (the "zeroth" track) on the platter 100 is assigned the position zero '0'; the center of the next track (the first track) is assigned '256' and so forth. In general, the center of the 'N'th track is assigned the position (256×N).

In FIG. 5, the second track is shown. Therefore, the center 220 of the track 210 is at position 512, the innermost edge 222 of this track is at position 384 (512−128) and the outermost edge 224 of this track is at position 639 (512+127). Thus, for a traditional read/write head 215, the microcontroller will specify a desired position of 512 to position the read/write head 215 at the center 220 of the track 210. If the read/write 215 head deviated from the center 220, for example, to position 589, the PES will be (desired position−actual position=512−589) at −77. Thus, the PES says that the read/write head 215 is positioned 77/256ths of a track away from the center 220 of track 2 (210), and the negative sign of the PES indicates that the read/write head 215 is outside of the track center 220 (thus, the required correction to get back to center of the track is to move inward—in the direction of decreasing positions).

In an MR type system 216, where the read and write heads are separate, it is important to note that the position read from the platter will be that of the read head 217 (because the read head 217 reads the bursts and the greycode from the platter). Therefore, to position the write head 218 over the optimum read position on the track, the read head 217 must be positioned over a position which will deviate from the center 220 of the track by an amount depending upon the mechanical construction of the system 216. This may be as much as 30% or more of the servo pitch.

To position the write head 218 over the desired position on the track 220 in the MR type system 216, which will be referred to alternatively as the center or correct read position, the microcontroller will specify the desired location of the read 217 head, and then calculate the PES based on this desired location. For example, if the read head 217 and write head 218 are separated by 77/256ths of a track, the microcontroller will specify a desired position of (512+77) 589. When the read head 217 reads a greycode and A, B, C, D bursts which indicate that it is at position 589, the PES will be (desired position−actual position=589−589) zero '0.' Because the PES is zero, the microcontroller will not specify any correction signal; the read head 217 will stay at position 589 and the write head 218 will stay at position 512 as desired. Obviously, if the operation is a read operation, then the read head 217 must be positioned over the center 220 of the data written on the track, in which case the earlier description for the conventional read/write head 214 applies.

The latch circuity 124 of FIG. 1 is calibrated to read A, B, C, and D, such that the full scale reading (the value corresponding to the greatest intensity of burst signal) is 128. With this calibration, the actual position is determined the following way. First, the greycode is decoded to determine the track or cylinder number. Next, the cylinder number is multiplied by 256 to determine the position of the track center.

Next, A, B, C, and D are compared to determine the distance off center. This is called the raw offset value. The raw offset value is then linearized to compensate for the non-linear correlation between the strength of the signal generated in the read head as it passes over a magnetized burst signal and the distance from the magnetic center of the burst to the read head. The linearized raw offset is then added to the position of the track center determined earlier to obtain the actual position of the read head.

Figure 6:
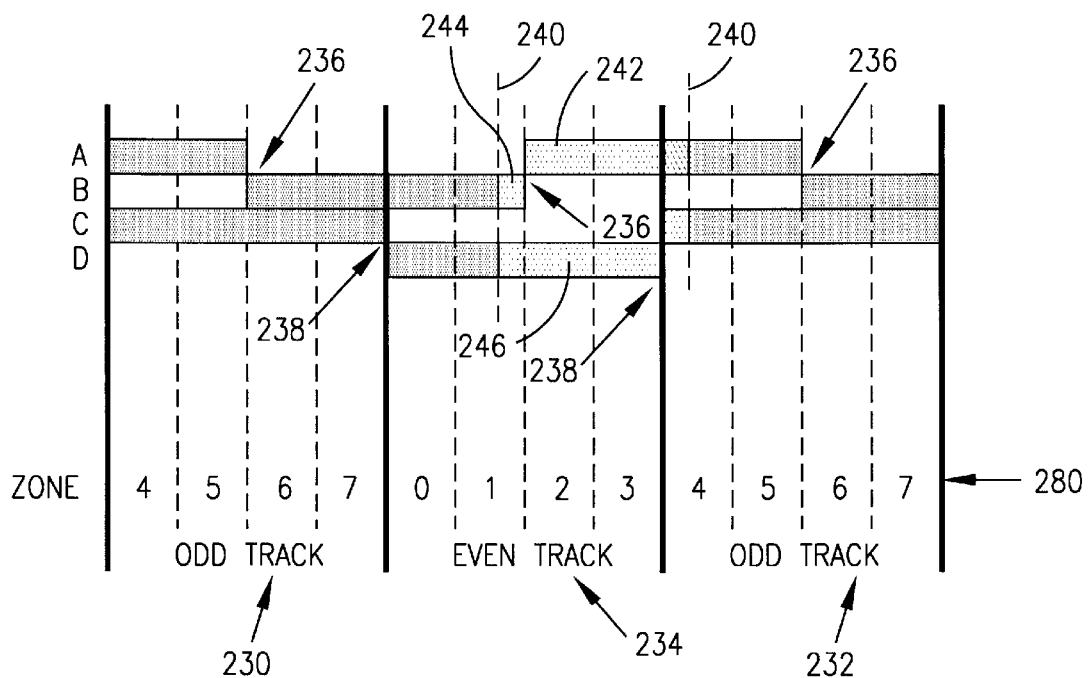
FIG. 6 is a chart showing how the quad burst signals are decoded to obtain the adjusted cylinder and raw offset information.

FIG. 6 is a diagram further showing the configuration of the signal bursts and the relationship of the burst magnitude to the position. Three adjacent tracks 230–232 are shown in the FIG. 6: two odd numbered tracks 230 and 232 and the even numbered track 234 in between. The diagraming convention from FIG. 4b will be followed in FIG. 6. FIG. 6 shows the pattern of the bursts for even and odd tracks. Note that the division 236 between A and B occurs at the center of tracks and the division 238 between C and D occurs at the boundary between tracks.

To help explain the calibration of the burst values and the position measurement, assume a read head positioned midway between the dotted lines 240 over the even track 234. The dotted lines 240 show the extent to which the read head will be able to pick up the magnetized (shaded) burst areas. For a read head in the position shown, the position of the head will be determined by taking the position of the center of the even track 234 and adding the (linearized) difference between the strength of the signal sampled during segment A (represented by the portion 242 of the rectangle within the dotted lines 240) and the strength of the signal sampled during segment B (244). Because A is greater than B, this difference will be positive, and the (linearized) offset, added to the position of the center of the even track 234 will increase the final actual position. This is correct because positions grow larger in the direction of higher numbered tracks. If B were greater than A, the difference (and thus the raw offset) would be negative, and the linearized offset would subtract from the position of the center of the even track.

When the read head is positioned near the edge of the track, the position is found by first adding a constant initial offset value (128 if the read head is near the outside edge, and −128 if the read head is positioned near the inside edge of the track) and second adding the difference between C and D to the total.

To calibrate the measurement, note what happens when the center of the read head moves to a position midway between the center of the track and the boundary between the even and the next highest odd track. This is shown in FIG. 6 as the area between the dotted lines 240. The correct position in that case would be (center of track position) +64, because the head is centered ¼ of the servo pitch outside of center, and one quarter of the servo pitch in this example is 256/4=64. Note that when the read head is in this position, the shaded portion 242 of the A area between the dotted lines 240 is slightly greater than ½ of the total area of the "A" rectangle. Note also that the shaded portion 244 of the "B" area between the dotted lines 240 is equal to the amount by which the shaded portion 242 of the "A" area exceeds ½ of the total area of the "A" rectangle. Therefore, A−B=½ of total area of a rectangle, which must equal 64. Thus, the total rectangle area must be calibrated to equal 128. This means that when the read head passes directly over the magnetic center of a magnetized area, the resulting signal in the read head is calibrated to read 128.

Figure 7:
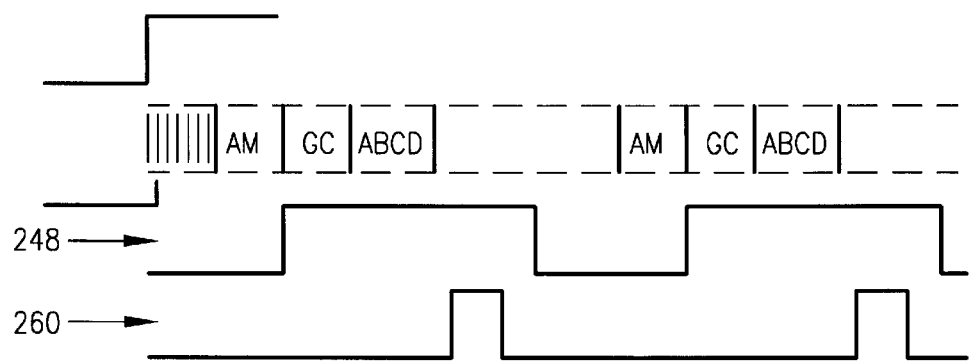
FIG. 7 depicts the read/write head servo positioning system according to one embodiment of the present invention, showing the relationship of the hardware PES to the other elements in the system.

FIG. 7 is a timing diagram showing the time required 248 for the prior art servo controller to effect a change in the movement of the read/write head. As the diagram shows, the time required for the microcontroller to read the greycode, read A, B, C, and D, calculate the current (linearized) position, calculate PES, and calculate and send the correction signal extends from the time that the grey code is read until after the bursts are read.

Figure 8:
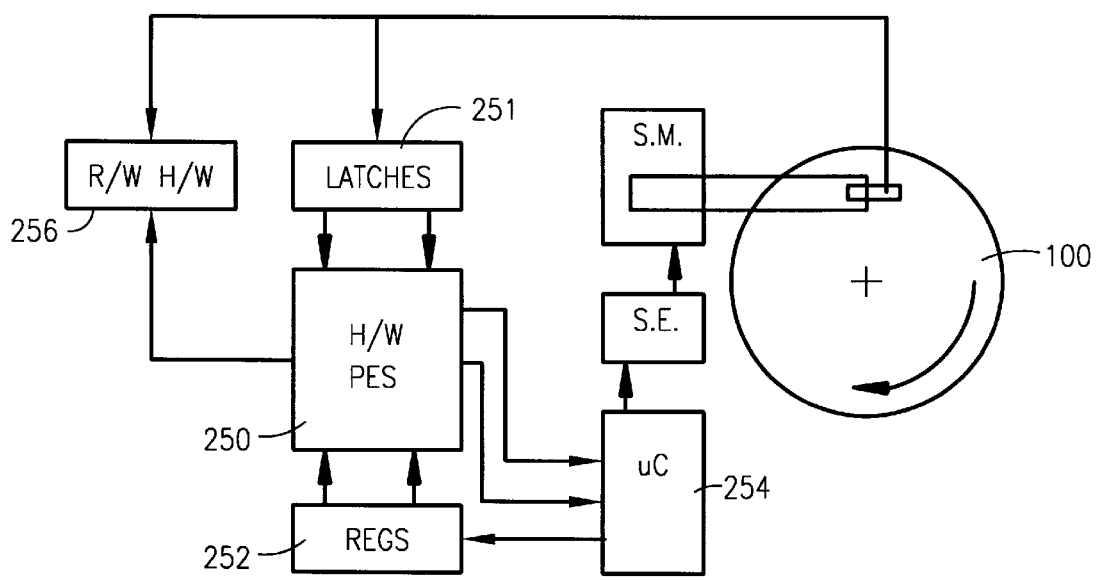
FIG. 8 is a block diagram illustrating the elements of the hardware PES circuit.

FIG. 8 is a block diagram of the read/write servo positioning system according to the present invention. As shown, a hardware PES calculator 250 is connected to latch circuitry 251, to a set of registers 252 including a desired position register and a threshold register, to a microcontroller 254 and to a read/write circuitry 256. The system functions as follows. First, the position information is read off the platter 100 as above and the greycode and A, B, C, and D are sampled and latched by electronics in the latch circuitry 251. Next, these values, along with previously stored values of desired position and threshold, are loaded into the PES calculator 250. The PES calculator 250 converts the greycode to a cylinder number, calculates the raw offset, linearizes the offset, calculates the actual position, calculates the PES, and generates an off track signal if the PES is too great. The PES and the off track signal are then sent to the microcontroller 254, which calculates a correction signal which it passes to the servo electronics. The off track signal is also sent to the read/write hardware 256 to disable a write operation when the head has moved too far off track.

Returning to FIG. 7, the time required 260 for the present invention shown in FIG. 8 to effect the change in movement of the read/write head is shown. Specifically, the figure shows that the microcontroller is not involved until after the calculation of PES. This occurs very quickly after the bursts are sampled, because the hardware calculating PES is much faster than the microcontroller 254. After the PES is calculated, the microcontroller 254 must calculate a correction signal. Note that the total time spent by the microcontroller 254 in the servo system of the present invention is smaller than the total time 248 required in the prior art (less bandwidth is spent controlling the servo). Faster burst to control effort also allows the design of a control system with greater phase and gain margin. Thus, the controller of the present invention is more stable than that of the prior art system.

Inside the PES Calculator

Figure 9:
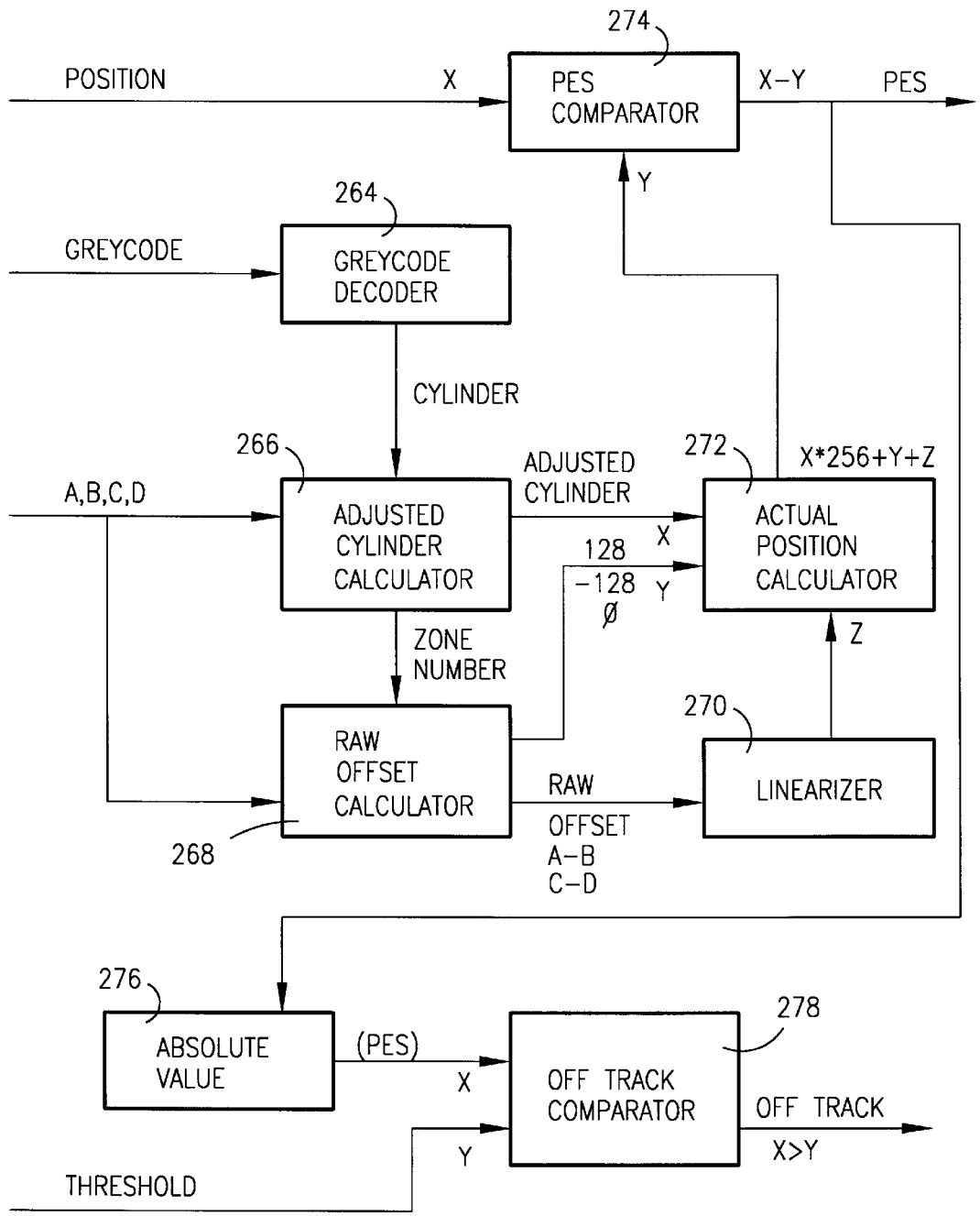
FIG. 9 is a block diagram showing one embodiment of the elements of the hardware PES circuit.

FIG. 9 is a block diagram showing the construction of the PES calculator 250. Specifically, a greycode converter 264 is provided to convert the greycode into a cylinder or track number. This cylinder number is used by an adjusted cylinder calculator 266 to determine the zone classification for the head position and to determine the adjusted cylinder number. The purpose of these will be described below.

The zone number is used by a raw offset calculator 268 to determine the raw offset position. This raw offset position is linearized by means of a linearizer 270. The linearized offset position is added to the position of the center of the track in an actual position calculator 272. The actual position is then compared to the desired position by the PES comparator 274 to obtain the PES. Finally, the absolute value of the PES is found by an absolute value circuit 276, and the absolute value of the PES is compared to the threshold value by an off track comparator 278. If the absolute value of the PES is greater than the threshold, the off track signal is sent.

Greycode Decoder

The greycode decoder 264 may be implemented in several ways. Typically, it will be implemented as combinatorial logic. The logic of the greycode decoder 264 can be described by the following functions, where G00–G13 represent the greycode digits and B00–B13 represent the binary digits of the cylinder:

B13=G13
B12=B13 XOR G12
B11=B12 XOR G11
B10=B11 XOR G10
B09=B10 XOR G09
B08=B09 XOR G08
B07=B08 XOR G07
B06=B07 XOR G06
B05=B06 XOR G05
B04=B05 XOR G04
B03=B04 XOR G03
B02=B03 XOR G02
B01=B02 XOR G01
B00=B01 XOR G00

These equations completely describe the greycode decoder 264, and may be used to generate appropriate circuitry.

Adjusted Cylinder Calculator

The adjusted cylinder calculator 266 of the present invention is provided to generate an adjusted cylinder signal. Placing the tracks on the platter closer together creates a greater opportunity for errors in reading the positioning information in the modern hard disk storage system. This is particularly true when the read head is slightly off track. Ironically, this is just when the microcontroller needs the most accurate position information so that quick corrective action may be taken.

A common error made in reading the positioning information is to misread the greycode. When the read head is off track somewhat, the read head will sometimes read the greycode of the neighboring track instead of its own greycode. This is partially because the greycode information is not strongly encoded. Thus, the greycode, and hence the final position calculation, will be in error.

To alleviate this problem, and thus provide a more accurate actual position signal, an adjusted cylinder calculator 266 is provided. This circuit functions as follows. First, the values A, B, C, and D are compared to determine if the read head is positioned over an odd or an even track. Then, the cylinder reported by the greycode decoder 264 is checked to see if an odd or even cylinder was read. If the cylinder number and the quad burst results match, i.e both are even or both are odd, then it is assumed that the greycode was read correctly and no adjustment is made (adjusted cylinder=cylinder).

If the cylinder and the quad burst results do not match, i.e. one is odd and the other is even, then the wrong greycode was read by the read head. An adjustment is made to the cylinder number according to the following pattern:

If the read head is on the outside ½ of the track, then the adjusted cylinder calculator assumes that the next highest greycode was read, and the cylinder number is decreased by one;

If the read head is on the inside ½ of the track, then the adjusted cylinder calculator assumes that the next lowest greycode was read, and the cylinder number is increased by one.

The adjusted cylinder calculator 266 also performs zone calculations necessary to turn the A, B, C, and D, values into a raw offset. Returning to FIG. 6, the adjusted cylinder calculator 266 compares the values of A, B, C, and D to determine which of eight zones 280 the read head is in. Zones 0–3 are assigned to the even tracks, and zones 4–7 are assigned to the odd tracks. In general, the term zone refers to a set of positions within the total set of positions encompassing two adjacent tracks. Inside zones are the zones on the inside of the tracks, here designated Z0, Z1, Z4, and Z5. Outside zones are those on the outside of the tracks, here designated Z2, Z3, Z6, and Z7. Center zones are those nearest the center of the track, designated Z1, Z2, Z5, and Z6. The positions in a center zone are closer to the center track position than to the position of the edge of the track. Positions which are not in the center zones are in the edge zones. Edge zones are those at the edges of the tracks, designated Z0, Z3, Z4, and Z7.

To determine which zone the read head is in, six comparisons, must be made. The classification into zones can be summarized by the following table:

The read head is in: if:
Zone 0: B>C, B>D, D>C
Zone 1: D>A, D>B, B>A

Zone 2: D>A, D>B, A>B
Zone 3: A>D, A>C, D>C
Zone 4: A>D, A>C, C>D
Zone 5: C>B, C>A, A>B
Zone 6: C>B, C>A, B>A
Zone 7: B>C, B>D, C>D These zones are also used by the adjusted cylinder calculator 266 to determine whether the read head is positioned over an even track or an odd one, and over the inside or outside of the track.

Figure 10:
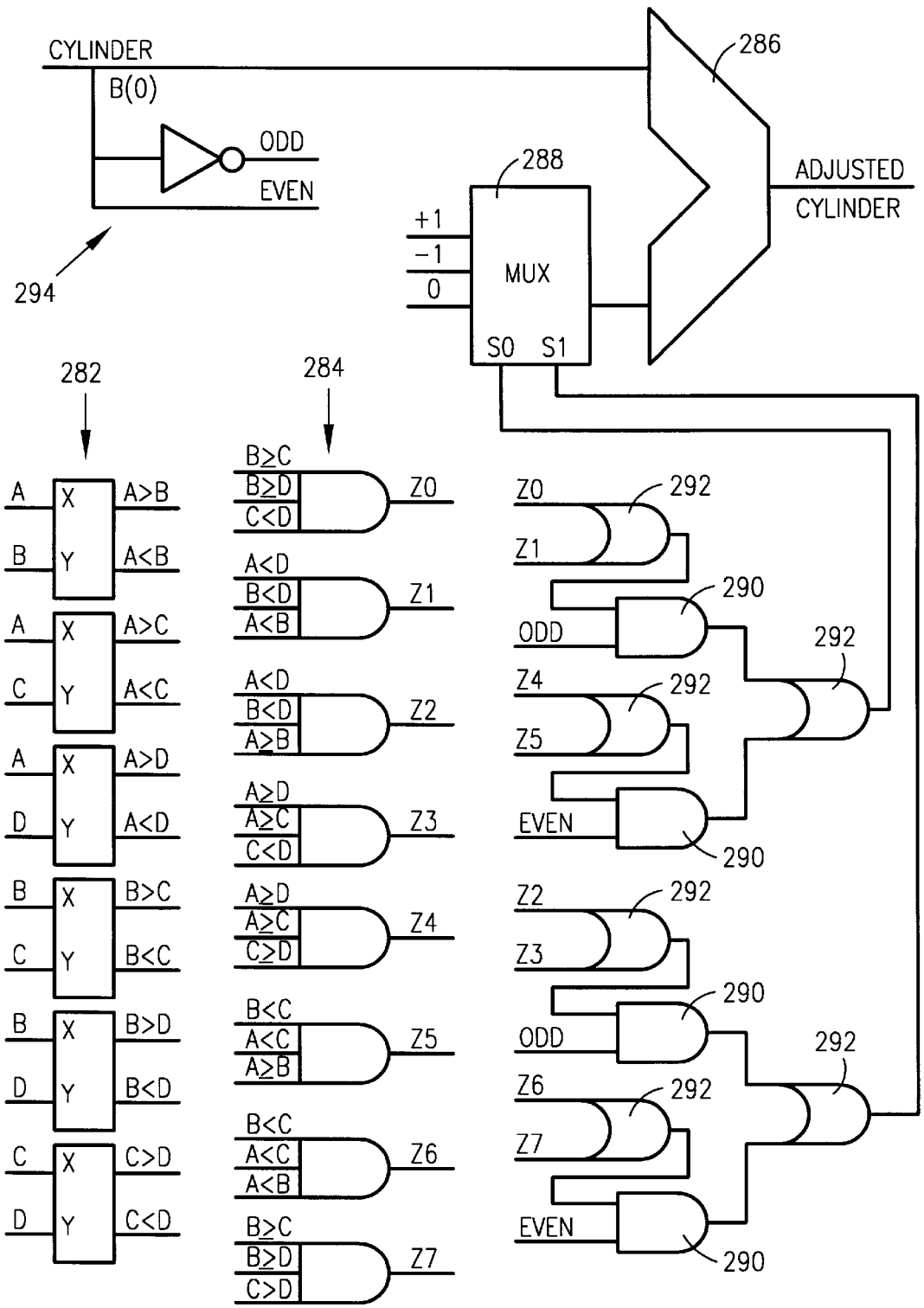
FIG. 10 is a logic diagram depicting six comparators which are shown to compare the values of A, B, C and D to each other.

The logic of the adjusted cylinder calculator 266 can be implemented in many ways. One possible way is shown in FIG. 10. In FIG. 10, six comparators 282 are shown to compare the values of A, B, C, and D to each other. The output of these is fed into a series of eight "and" gates 284 to select the eight zones. The output of each of these "and" gates 284 corresponds to the read head being in the corresponding zone.

Also shown is an adder 286. One of the inputs to the adder 286 is the cylinder number. The other input is connected to the output of a multiplexor 288. The multiplexor selects one of the inputs: +1,−1, or 0 according to the zone and cylinder number read. "And" gates 290 and "or" gates 292 provide the logic necessary to provide the select signals for the multiplexor 288. Finally, an odd signal and an even signal are generated 294 from the least significant bit of the cylinder number.

Raw Offset Calculator

The raw offset calculator 268 performs the following functions. First, an constant initial offset value is selected based on the zone number according to the following table:

Zones 1,2,5,6: 0
Zones 0, 4: −128
Zones 3, 7: +128

As described above, in this particular embodiment, the position signal is in units of 1/256th of a track. Therefore, the initial offsets for zones 0, 3, 4, and 7 are set to be ½ of a track or 128. This part of the raw offset calculator 268 could be generated by three tristate buffers, one for each output. For each tristate buffer, the output enable signal would be driven by 'ORing' together the appropriate zone signals (from the adjusted cylinder calculator 266). The input to each buffer would be hardwired to 0, −128 or +128 as appropriate.

Second, the raw offset is set according to the following table:

Zone 1 or 2: raw offset=A−B
Zone 5 or 6: raw offset=B−A
Zone 0 or 7: raw offset=D−C
Zone 3 or 4: raw offset=C−D For this circuit, the differences are first generated by negating the second operands (bit by bit) and adding them to the first operands with the carry-in to the adders hardwired to one '1'. Then, the outputs of these adders are buffered to the raw offset signal by tristate buffers. The output enable signals to the tristate buffers are fed by 'ORing' together the zone signals.

Linearizer

The linearizer 270 is provided to linearize the raw offset value provided from the raw offset calculator 268. This is necessary because the correlation between the strength of the signal sampled during a burst segment is not linearly related to the distance from the center of the magnetized area. In other words, a sampled burst value of half the maximum sampled value would not necessary correlate with a position ¼ track away from the center of the magnetized area. In order to calculate the position of the read head, the offset must be linearly related to the physical distance between the read head and the magnetic center of the magnetized area. This means that where, for instance, the center of the track is at position 512 and the edge of the track is at position (512+128) 640, the position (512+64) should correspond to the point midway between the center and the edge. The linearizer 270 ensures that this is the case.

In the prior art, the raw offset is linearized by the microcontroller, which uses a polynomial model of the non-linearity to linearize the raw offset. In the present invention, the linearizer 270 can be implemented in many ways. One embodiment of the linearizer 270 uses a look-up table. The index into the table is the raw offset (128 entries) and the values in the table are the linearized offset values. These values, which correspond to the solutions to the polynomial used by the prior art, are known in the art. The table values may also include a normalization factor to ensure that the maximum burst signal produces the desired offset value. This look up table could be implemented as a memory chip or as memory cells in the hard disk controller ASIC. This could either be ROM, EEPROM, or SRAM, but SRAM is preferred to provide faster calibration.

Actual Position Calculator

The actual position calculator 272 multiplies the adjusted cylinder by 256 to get the position of the center of the track. To this it adds the initial offset value and the linearized offset. These functions are all well known in the art and can be implemented with conventional circuitry.

Absolute Value Circuit

The absolute value circuit 276 negatives the PES if the PES is negative. This too is a common circuit, well known in the art and implementable with conventional circuitry.

Returning to FIG. 6, the hardware PES calculator operates as follows. The values of A, B, C, and D, are read from the latches (251 of FIG. 8). For example, A may be 72, B may be 6, C may be 8, and D might be 68, corresponding to the areas of the burst rectangles between the dotted lines. The adjusted cylinder calculator 266 would compare A, B, C, and D and determine that the read head is positioned in zone 3 (A>C, A>D, D>C).

If the cylinder number (decoded by the greycode decoder 264) is an odd number, then the cylinder number is wrong. Because the read head is in an outside zone, the adjusted cylinder calculator 266 subtracts one from the cylinder number to obtain the adjusted cylinder number. If the cylinder number is an even number, then the cylinder number corresponds to the burst signals (A, B, C, and D) and the cylinder number is not changed to obtain the adjusted cylinder number.

The zone is passed to the raw offset calculator 268. The raw offset calculator 268 subtracts D from C to obtain the raw offset (8−68=−60) because the read head is in zone 3. This value (e.g. −60) is used to access a table to find the offset. The raw offset calculator 268 also selects an initial offset value of 128, which will be passed on to the actual position calculator 272.

The raw offset is then linearized to account for non-linearities in the measurement of A, B, C, and D. The linearized offset is passed onto the actual position calculator 272, which adds the offset value (128) to the linearized offset (taken from the X table) to the position of the center of the track (adjusted cylinder number=256) to obtain the actual position of the read head. Thus, the final position will equal (track center+68).

Returning to FIG. 9, it is obvious that the designer could select from the elements contained in the hardware PES calculator without utilizing them all. To the extent that an element is included, the delay time to control effort will be reduced, the microcontroller bandwidth will be increased, and the system will be better protected and/or faster. Therefore, selecting the elements in the final design will largely be a matter of trading off the extra die area in the controller required by the additional element with the added speed, and/or protection benefits of the additional element.

For instance, it is possible that one embodiment of the present invention would include only the greycode decoder 264 and the adjusted cylinder calculator 266. In that embodiment, the adjusted cylinder and zone information are passed on to the microcontroller 254, which completes the calculations. To the extent that an additional element of the PES is included, the benefits of a more robust, less error prone control system are gained along with the benefits of greater speed and lower microcontroller bandwidth. Later as prices for memory or die area drop, the linearization can be implemented as SRAM, adding further increased speed and lower bandwidth.

Finally, as the whole circuit is implemented as described above in reference to FIG. 9, the greatest benefits will accrue. Among other things, the delay time between the read head going off track and the off track signal shutting down the read/write logic is drastically reduced, from about 100 microseconds to about 40 microseconds.

Other features and advantages of the present invention may become apparent to a person of skill in the art who studies the present invention disclosures. Therefore, the scope of the present invention is to be limited only by the following claims.

What we claim is:

1. An adjusted cylinder calculator for use in a servo positioning system for positioning a read head in a hard disk drive, the adjusted cylinder calculator comprising:

means for receiving a cylinder number;

means for determining whether the read head is positioned over the inside of an even track, the outside of an even track, the inside of an odd track, or the outside of an odd track;

first output means responsive to the determining means wherein
     the cylinder number is even and the read head is positioned over an even track, or
     the cylinder number is odd and the read head is positioned over an odd track;
     for outputting the cylinder number as the adjusted cylinder number;

second output means responsive to the determining means wherein
     the cylinder number is even and the read head is positioned over the inside of an odd track, or
     the cylinder number is odd and the read head is positioned over the inside of an even track,
     for adding one (1) to the cylinder number and outputting the result of the addition as the adjusted cylinder number; and third output means responsive to the determining means wherein
     the cylinder number is even and the read head is positioned over the outside of an odd track, or
     the cylinder number is odd and the read head is positioned over the outside of an even track,
     for subtracting one (1) from the cylinder number and outputting the result of the subtraction as the adjusted cylinder number.

2. An apparatus according to claim 1 wherein the determining means comprises:
   means for receiving sampled burst values from the read head; and
   means for comparing the magnitude of the burst values.

3. In a disc drive comprising one or more discs supported for rotation and storing data along tracks on at least one surface of each of the disc,
   means for selectively positioning a transducer over a selected one of the tracks on the disc, and
   means for selectively calculating a position error signal for the transducer relative to the selected track.

4. In a disc drive as claimed in claim 3, the means for selectively calculating a position error signal further comprising means for reading burst values and means for calculating an adjusted cylinder number from a position information read from the pattern and the burst values.

5. A hardware position error signal (PES) calculator for a servo positioning system for use in a disc drive, the hardware PES calculator comprising:
   an adjusted cylinder calculator having a first input to receive a cylinder number an adder coupled to the first input receive the cylinder number as a first adder input;
   a second input to receive a plurality of burst values and a digital circuit coupled to the second input to receive the plurality of burst values, the digital circuit producing an adjustment value, the digital circuit being coupled to a second adder input to receive the adjustment value such that the adder adds the cylinder number and the adjustment value to produce an adjusted cylinder number.

6. The hardware PES calculator as claimed in claim 5, wherein:
   the digital circuit includes a plurality of compensators configured to receive the plurality of burst values to produce a comparator output such that the digital circuit utilizes the comparator output to produce the adjusted value.

7. A hardware position error signal (PES) calculator for a servo positioning system for use in a disc drive, the hardware PES calculator comprising:
   an adjusted cylinder calculator having a first input to receive a cylinder number and a second input to receive a plurality of burst values, the adjusted cylinder calculator producing an adjusted cylinder number;
   an actual position calculator coupled to the adjusted cylinder calculator to receive the adjusted cylinder number, the actual position calculator configured to produce an actual position; and
   a PES comparator having a first input to receive a desired position, the PES comparator being coupled to the actual position calculator to receive the actual position as a second input, the PES comparator being configured to compare the desired position with the actual position and produce a PES signal.

8. The hardware PES calculator as claimed in claim 7, wherein:
   the adjusted cylinder calculator produces a zone number; and
   a raw offset calculator is coupled to the adjusted cylinder calculator configured to receive the zone number, the raw offset calculator producing a raw offset position.

9. The hardware PES calculator as claimed in claim 8, further comprising:
   a linearizer coupled to the raw offset calculator to receive the raw offset position, the linearizer producing a linearized offset position.

10. The hardware PES calculator as claimed in claim 9, wherein:

the actual position calculator coupled to the linearizer to receive the linearized offset position, the actual position calculator producing the actual position from the linearized offset position and the adjusted cylinder number.

11. The hardware PES calculator as claimed in claim 7, further comprising:

an off track comparator coupled to the PES comparator to receive the PES signal, the off track comparator producing an off track signal if the PES signal is greater than a threshold value.

12. The hardware PES calculator as claimed in claim 7, further comprising:

the adjusted cylinder calculator having:
an adder coupled to the first input to receive the cylinder number as a first adder input;
a plurality of comparators coupled to the second input to receive the plurality of burst values producing a plurality of comparator outputs; and
a digital circuit coupled to the plurality of comparators, the digital circuit producing an adjustment value, the digital circuit being coupled to a second adder input such that the adder adds the cylinder number and the adjustment value to produce an adjusted cylinder number.

13. A method of positioning a read head over a desired position on a platter utilizing a servo positioning system, comprising steps of:

(a) storing the desired position;
(b) reading position information from the platter and sampling greycode information and burst values;
(c) loading the desired position, the position information, the greycode information and the burst values into a position error signal (PES) calculator;
(d) converting the greycode information into a cylinder number;
(e) calculating an adjusted cylinder number from the cylinder number and the burst values;
(f) calculating a PES using the adjusted cylinder number and the position information;
(g) calculating a correction signal from the PES; and
(h) adjusting the head according to the correction signal with a servo electronics unit.

14. The method of positioning a read head over a desired position on a platter as claimed in claim 13, further comprising steps of:

(i) storing a threshold;
(j) loading a threshold into the PES calculator;
(k) generating an off track signal if the PES is greater than the threshold; and
(l) disabling a write operation if the PES is greater than the threshold.

15. The method as claimed in claim 13, further comprising a step (i) of determining whether the read head is positioned over an inside edge of an even track, an outside edge of an even track, an inside edge of an odd track, or an outside edge of an odd track, the determining step (i) comprising steps of:

(ii) producing a first output in response to determining the read head position wherein
the cylinder number is even and the read head is positioned over an even track, or
the cylinder number is odd and the read head is positioned over an odd track;
(ii) producing a second output in response to determining the read head position wherein
the cylinder number is even and the read head is positioned over the inside of an odd track, or
the cylinder number is odd and the read head is positioned over the inside of an even track; and
producing a third output in response to determining the read head position wherein
the cylinder number is even and the read head is positioned over the outside of an odd track, or
the cylinder number is odd and the read head is positioned over the outside of an even track.

16. The method as claimed in claim 13, wherein:

the step (e) further includes comparing magnitudes of the burst values in calculating the adjusted cylinder number.

* * * * *